United States Patent [19]
Fasen et al.

[11] Patent Number: 6,031,673
[45] Date of Patent: Feb. 29, 2000

[54] SERVO BAND VERIFICATION IN LINEAR TAPE SYSTEMS HAVING TIMING-BASED SERVO FORMATS

[75] Inventors: Donald J. Fasen, Boise, Id.; George M. Clifford, Jr., Los Altos Hills, Calif.

[73] Assignee: Hewlett-Packard Company, Palo Alto, Calif.

[21] Appl. No.: 09/034,971

[22] Filed: Mar. 4, 1998

[51] Int. Cl.[7] .............................. G11B 5/09; G11B 15/12; G11B 5/584
[52] U.S. Cl. .......................... 360/53; 360/63; 360/77.12
[58] Field of Search ................................ 360/48, 53, 63, 360/77.12

[56] References Cited

U.S. PATENT DOCUMENTS

| | | | |
|---|---|---|---|
| 5,523,904 | 6/1996 | Saliba | 360/77.12 |
| 5,689,384 | 11/1997 | Albrecht et al. | 360/77.12 |
| 5,949,607 | 9/1999 | Kalfs et al. | 360/77.12 |

*Primary Examiner*—W. Chris Kim

[57] ABSTRACT

A device for formatting a linear data storage tape includes a servo write head configured to write a pattern of magnetic transition stripes along a servo band of the linear data storage tape. The servo write head is configured to produce stripes having lateral widths that are significantly greater than that of a servo read element of a data read/write head designed for use with the linear data storage tape. Each stripe has either a positive non-zero azimuth or a negative non-zero azimuth. The device also includes a magnetic readback element that produces a servo verify signal. The magnetic readback element extends laterally across the full widths of the magnetic transition stripes and is oriented at an azimuth between the positive and negative non-zero azimuths of the magnetic transition stripes. A pulse detector is configured to detect pulses in the servo verify signal. Defect detection logic counts the numbers of pulses in the servo verify signal and compares such numbers with expected numbers to detect defects. Defects are also detected by identifying any pulses that exceed a predefined maximum threshold.

20 Claims, 10 Drawing Sheets

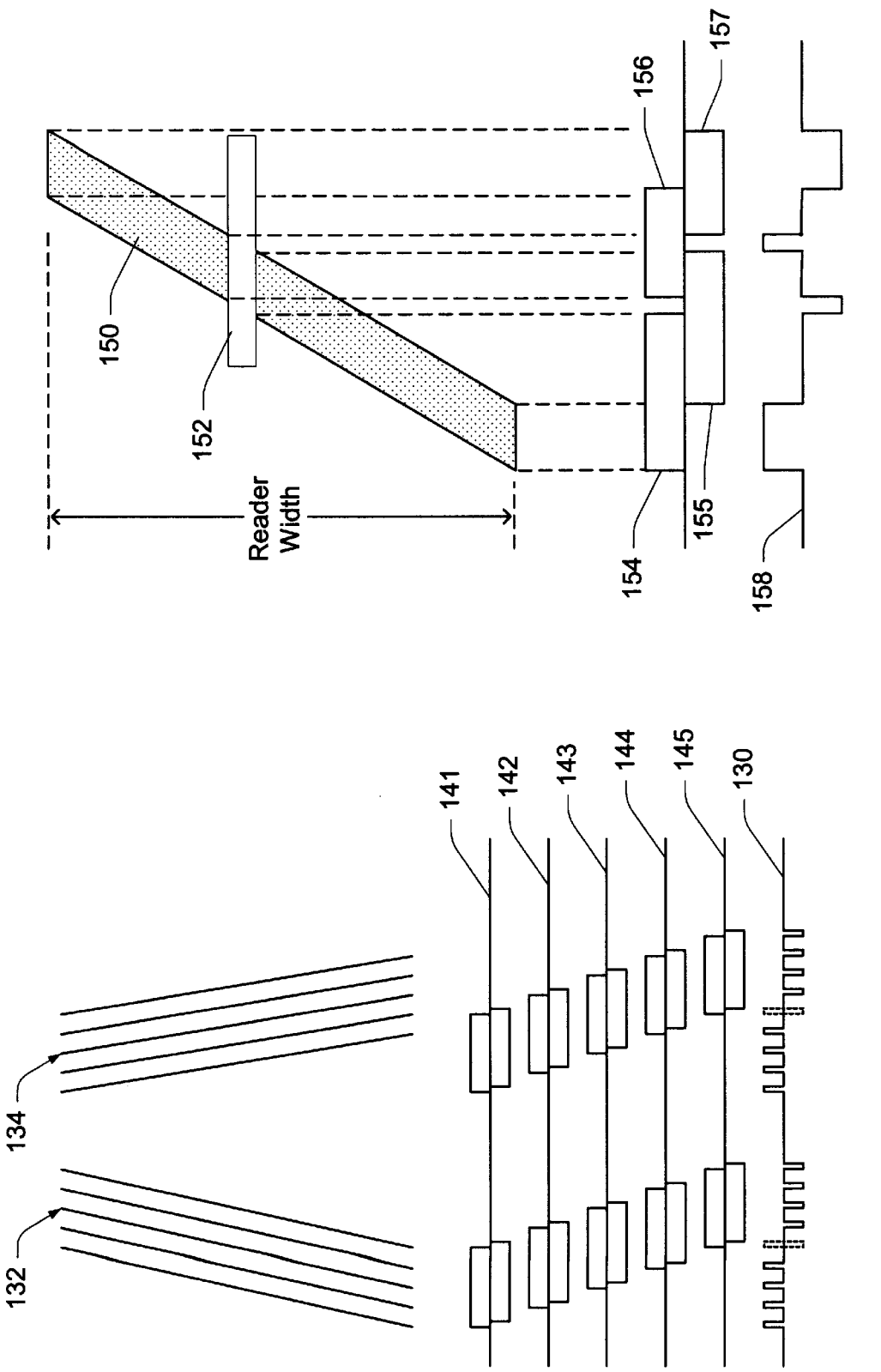

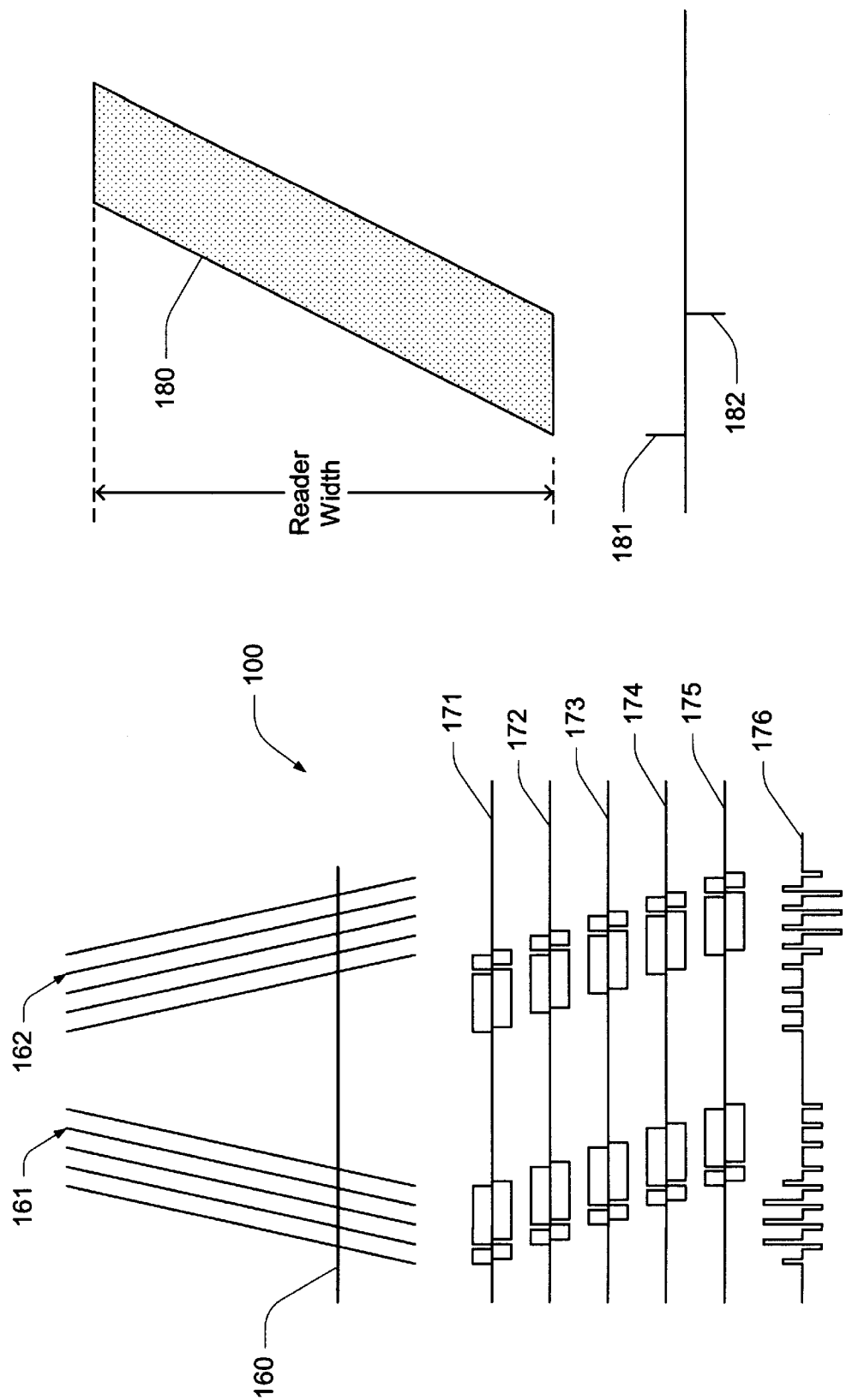

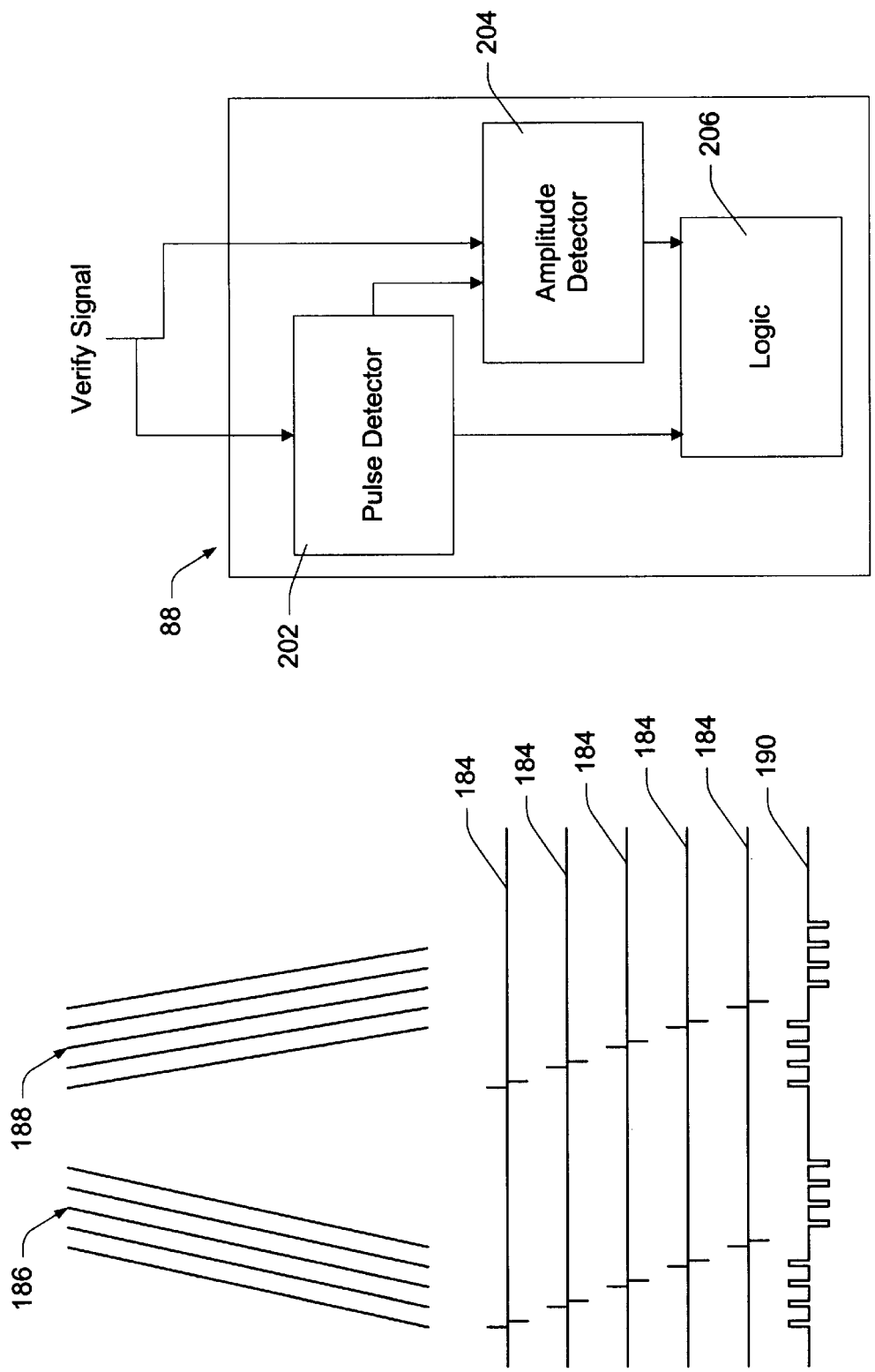

SERVO BAND VERIFICATION IN LINEAR TAPE SYSTEMS HAVING TIMING-BASED SERVO FORMATS

FIELD OF THE INVENTION

This invention relates to linear tape systems and to methods of writing and verifying servo bands in linear tape systems having timing-based, continuously-variable, positioning servos.

BACKGROUND OF THE INVENTION

Because of its relatively low cost, linear tape is commonly used as a medium for storing large amounts of digital data for archival purposes. For example, disk-based memory is often archived on linear data storage tape.

Data is formatted on linear tapes in a plurality of tracks that extend longitudinally along the tape. A tape read/write head is moveable laterally across the tape to read or write different tracks. In many cases, multiple tracks can be written or read at the same time by using a tape head with multiple read/write elements.

When reading or writing a linear data storage tape, accurate lateral positioning of the tape head is very important. To achieve such accuracy, servo bands are prewritten to the tape. The servo bands are detected by the tape head during reading and writing to determine the exact lateral position of the tape head relative to the linear tape.

FIG. 1 illustrates, conceptually, the use of servo bands. FIG. 1 shows a segment of a linear tape 10 that extends in a longitudinal direction x, and that has a lateral dimension y. The tape includes a plurality of servo bands 12. In the simplified example of FIG. 1 there are three servo bands. The servo bands are written to the tape during a preparatory "formatting" process, prior to actual use of the tape for data storage. The servo bands are spaced laterally from each other by a specified distance.

Data tracks 14 are located between the servo bands. The lateral positions of the data tracks are specified relative to the servo bands.

When reading or writing tape 10, a tape head senses the servo bands with servo read elements and positions itself precisely relative to the servo bands. Within the tape head, data read/write elements are spaced relative to the servo read elements so that the data read/write elements will be positioned over data tracks 14 when the servo read elements are positioned accurately over the corresponding servo bands.

In an actual embodiment, a linear tape might have more than three servo bands, with discrete tracks defined within each servo band. Many tape heads are configured to span two adjacent servo bands at any given time and to read or write only the data tracks between those servo bands. To read or write other data tracks, such a tape head is repositioned to span two different servo bands.

There are different ways to derive lateral position information from a servo band. One common way is to divide a servo band into two half tracks, which are recorded with different information (such as two distinct frequencies or bursts occurring at distinct times). A single servo head straddles the boundary between the half tracks, and position information is obtained by comparing the amplitude or phase responses of the signals generated from the respective half tracks.

A different approach has been described in Albrecht, et al., *Time-Based, Track-Following Servos for Linear Tape Drives*, Data Storage Magazine, 1997 (p. 41), which is hereby incorporated by reference. This approach uses timing-based, continuously-variable servo bands which are read by narrow servo heads.

FIG. 2 shows an example of a continuously-variable, timing-based servo pattern, along with a signal generated by a servo read element positioned over the servo pattern. The pattern consists of alternating magnetic transitions at two different azimuthal slopes. Relative timing of pulses generated by the read element depends on the lateral position of the head.

More specifically, the servo band illustrated in FIG. 2 has a series of magnetic transitions 20 and 22 referred to as "stripes" that are recorded on the tape with alternate azimuthal slopes. Every other stripe 20 has a positive, non-zero slope or azimuth, while the intervening stripes 22 have negative slopes or azimuths. Note that such azimuths are specified relative to the lateral or y tape direction (across the width of the tape).

FIG. 2 shows the path and width of a servo read element, indicated by reference numeral 24, that is designed for use with this tape. The servo head reads a lateral width that is significantly less than the full lateral widths of the stripes themselves. The signal generated by the servo head is represented by trace 26, illustrated directly below the illustrated magnetic transition stripes. When the servo head encounters a stripe, it generates a positive pulse. When the servo head leaves the stripe, it generates a negative pulse.

Lateral position information can be derived by comparing the distances between pulses. For example, a first distance A can be defined as the distance from a positive stripe to the next negative stripe, while a second distance B can be defined as the distance from a negative stripe to the next positive stripe. When the servo head is centered over the servo band, A will be equal to B: consecutive pulses will occur at equal intervals.

In actual implementation, alternating "bursts" of stripes are used, with a burst being defined as one or more individual magnetic transition stripes.

FIG. 3 shows an example of a servo band layout utilizing alternating bursts of magnetic transition stripes. Each burst has an opposite azimuthal slope from the previous burst. The servo pattern includes repeating frames. Each frame has a first subframe A and a second subframe B. Each subframe has a pair of bursts, with the bursts of each frame having different azimuthal slopes. Subframe A has a first burst 38 with five equally-spaced stripes having a positive azimuthal slope. Subframe A has a second burst 40 with five equally-spaced stripes having negative azimuthal slopes. Subframe B has similar bursts 42 and 44, except each of these bursts has four stripes.

It is preferable to record servo bands on a tape prior to its actual use for storing data. In order to ensure precise spacing of servo bands such as shown in FIGS. 2 and 3, it is desirable to use a patterned write head, configured to simultaneously write corresponding stripes of multiple servo bands.

FIG. 4 shows an example of patterned servo write head 46 for writing multiple servo bands on a single linear tape. The head's write pattern is illustrated relative to an underlying linear tape 47 that has four servo bands 48. At lateral positions corresponding to each servo band, the write head pattern includes pairs of write elements or gaps. One element 50 of each pair is configured to produce a magnetic transition stripe having a positive slope. Another element 52 of each pair is configured to produce a magnetic transition stripe having a negative slope. Using this configuration, a single current pulse to the head writes stripes simultaneously to all of the servo bands. Such pulses are repeated to produce stripes in the desired pattern, with the desired spacing.

After writing the servo bands, it is highly desirable to verify that the stripes have been correctly written to the tape. Defective magnetic transitions might result from write head clogging, from interference with debris, and from servo write head wearing. In addition, defects such as scratches in the tape itself can cause un-writable regions that result in signal dropouts, noise, and other errors. Tape defects in the form of scratches are particularly troublesome because they can cause offsets in detected position signals.

There are several different ways that servo band verification might be accomplished. One way would be to read the servo band stripes with a plurality of conventional, narrow, data read elements positioned across the width of the tape. However, this would require an unwieldy number of such read elements in order to cover the width of each servo band.

Another way would be to use a read head configured similarly to the servo write head. Such a read head would have relatively wide read elements oriented with azimuths matching the azimuths of the written stripes themselves.

FIG. 5 shows an example of a servo band having a longitudinal scratch that is approximately 10% of the width of the entire servo band. Shown in FIG. 5 are servo stripes 60 with alternating positive and negative azimuths. FIG. 5 also shows a servo verify head 61 with a pair of wide read elements 62 and 64 (shown by dashed line to distinguish them from the servo band stripes) positioned at positive and negative azimuths to match the azimuths of the servo band stripes 60. Read element 62 is used to verify stripes having a positive azimuth. Read element 64 is used to verify stripes having a negative azimuth. A region 68, delineated by a dashed rectangle, indicates a defective area on the tape which does not record magnetic transitions. Thus, portions of stripes 60 are missing when the pulses overly area 68.

Waveform 66 illustrates a signal produced by read element 62. When read element 62 encounters a matching stripe, it generates a positive pulse and then a negative pulse. When the stripe has a 10% defect, a pulse is generated having an amplitude that is approximately 90% of its normal amplitude. By monitoring the amplitudes of these pulses and noting those having low amplitudes, it is theoretically possible to detect defects. In practice, however, a 10% signal variation is not enough for reliable detection. Thus, although a scratch having a width of 10% of the servo band is serious enough to impair servo positioning capability, it is perhaps not wide enough for the scheme of FIG. 5 to reliably detect.

The inventors have developed a different way to verify servo bands of the type described above. The invention allows full verification of servo bands while requiring only a single, wide, read element for each servo band.

SUMMARY OF THE INVENTION

In accordance with the invention, a timing-based servo band such as described above or a tape band using similarly written magnetic data is verified with a single, wide read element oriented at an intermediate azimuth between the positive and negative azimuths of the band's magnetic transition stripes. Such a read head produces a series of pulses having a particular amplitude for a non-defective servo band. Defects in the servo band stripes result in different numbers of pulses, some having dramatically higher amplitudes. Thus, comparators can be used to detect pulses with both low and high amplitudes. Such pulses are counted and compared with predefined count thresholds to identify defective regions of the servo bands. This results in much more reliable defect detection than any previously proposed schemes.

DESCRIPTION OF THE DRAWINGS

FIG. 10 is a diagrammatic view illustrating analysis of burst of non-defective servo stripes in accordance with the invention.

FIG. 11 is a diagrammatic view illustrating analysis of a single defective servo stripe in accordance with the invention.

FIG. 12 is a diagrammatic view illustrating analysis of burst of defective servo stripes in accordance with the invention.

FIG. 13 is a diagrammatic view illustrating an alternate analysis of a single non-defective servo stripe in accordance with the invention.

FIG. 14 is a diagrammatic view illustrating an alternate analysis of burst of non-defective servo stripes in accordance with the invention.

FIG. 15 is a block diagram of control electronics in accordance with the invention.

DETAILED DESCRIPTION OF THE INVENTION

Figure 6:
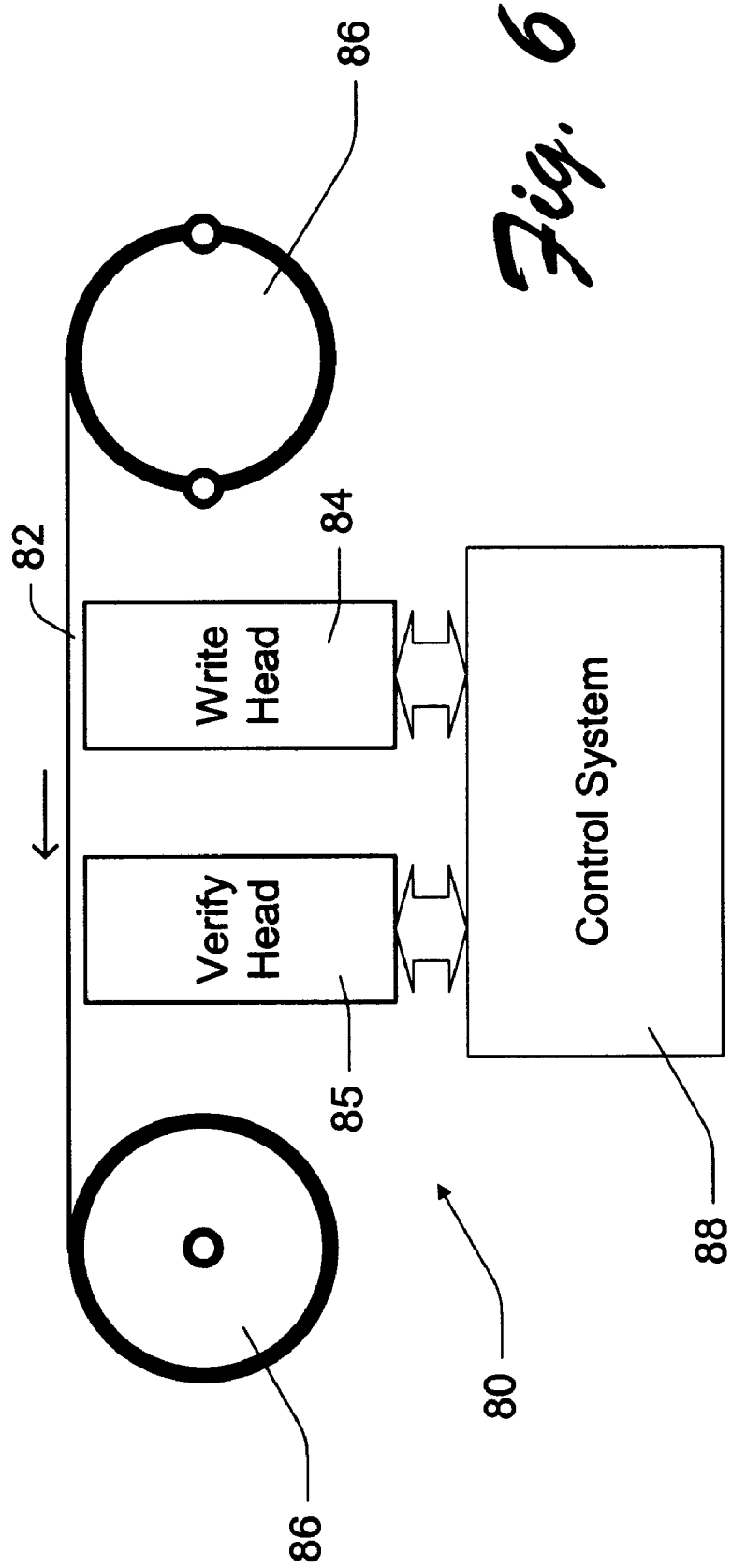
FIG. 6 is a simplified block diagram of a system for formatting and verifying servo tapes in accordance with the invention.

FIG. 6 shows elements of device or system 80 for formatting a linear data storage tape in accordance with the invention. System 80 both writes a servo band on a tape and verifies the servo band by detecting any errors in previously written magnetic transitions. System 80 includes a linear storage tape 82, a servo write head 84, a servo verify head 85, a drive system 86 that transports the tape past the tape head in the direction indicated by the arrow, and control electronics 88. In operation, the system is configured so that servo band stripes are written by servo write head 84 as the tape moves past servo write head 84. The servo band stripes are then verified as they move past servo verify head 85.

Figure 7:
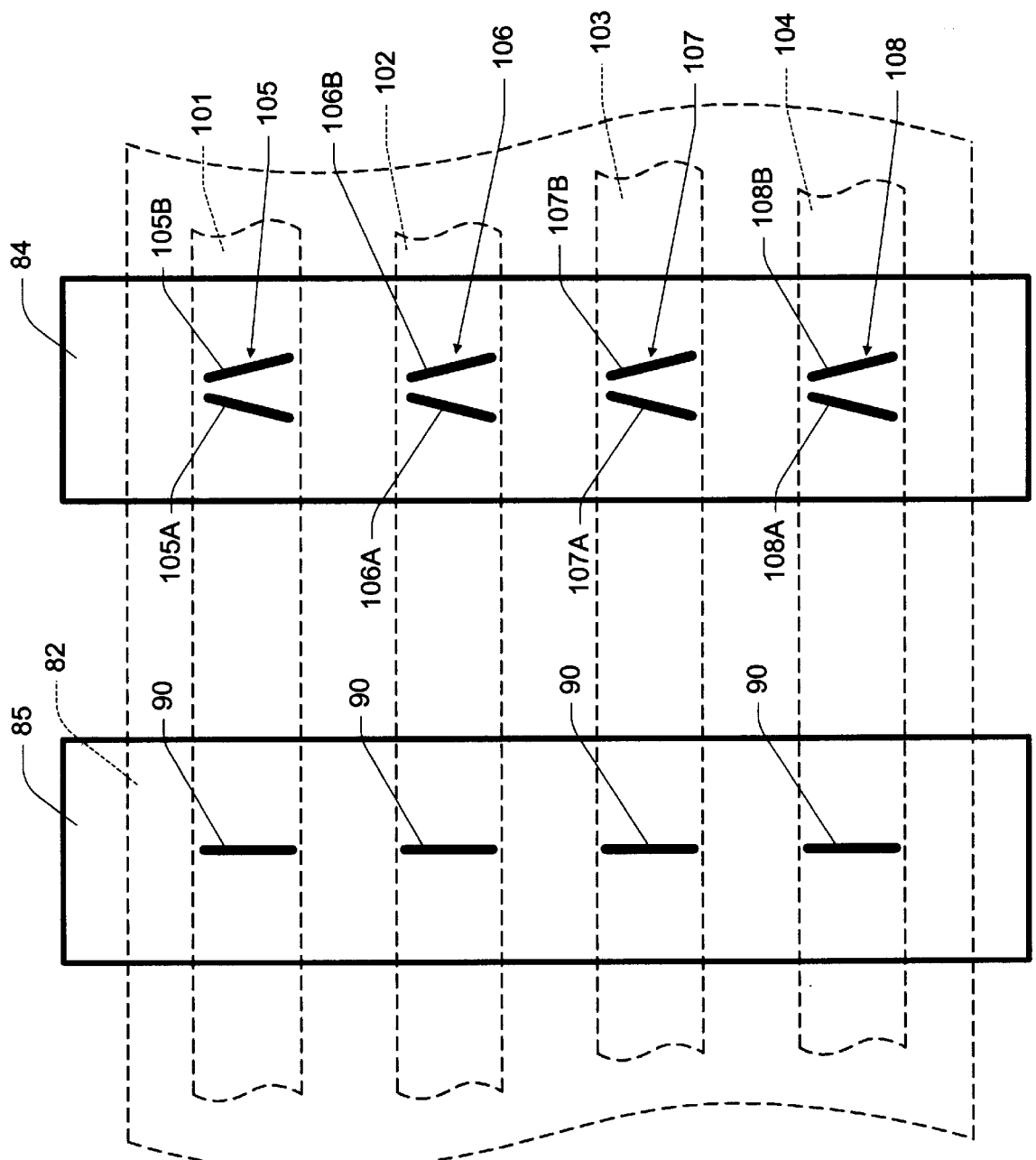
FIG. 7 is a diagrammatic view illustrating a servo band write head and a servo verify read head in accordance with the invention.

FIG. 7 shows a segment of linear data storage tape 82. A plurality of servo bands extend longitudinally along tape 82.

In this example, the tape has four servo bands, labeled 101, 102, 103, and 104. A plurality of data tracks (not shown) are positioned between respective pairs of servo bands. Note that FIG. 7 is drawn for purposes of conceptual illustration, and does not therefore indicate relative sizes of the various illustrated tape features.

In the described embodiment, data storage tape 82 is designed for use with a data read/write head having a pair of servo read elements and a plurality of intervening data read/write elements. Accordingly, the servo bands are spaced laterally across the tape from each other, with intervening data tracks or bundles. In use, a data read/write head is positioned over an adjacent pair of servo bands while data is read or written between those servo bands using data read/write elements of the data head. Thus, each set or bundle of data tracks is associated with a surrounding pair of servo bands.

All the servo bands have similar or identical longitudinal patterns of magnetic transitions or stripes. Each pattern is similar to the pattern shown in FIG. 3 above, comprising alternating bursts of non-zero-azimuth magnetic transitions. Every other burst has transitions with positive slopes, and the intervening bursts have transitions with negative slopes.

FIG. 7 illustrates a servo write head 84 that is used to establish servo bands on tape 82 during a formatting process before the tape is used for data storage. Servo write head 84 has a pattern of servo write elements or gaps that are activated with a single write pulse to simultaneously produce a plurality of magnetic transition stripes laterally across a linear data storage tape. The write element pattern is illustrated relative to linear tape 82 and servo bands 101, 102, 103, and 104. The pattern of write gaps includes at least one pair of magnetic transition stripes for each of a plurality of servo bands on the linear data storage tape. The two magnetic transition stripes of any given pair have different azimuthal slopes. More specifically, the write head pattern includes pairs of write gaps 105, 106, 107, and 108 at different lateral positions on the write head, corresponding to servo bands 101, 102, 103, and 104. One gap of each pair (labeled with an "A" suffix) is configured to produce a magnetic transition stripe having a positive slope. Another gap of each pair (labeled with a "B" suffix) is configured to produce a magnetic transition stripe having a negative slope. The various write elements or gaps are pulsed repeatedly to produce the servo band pattern shown in FIG. 3. Although other configurations could be used, the described embodiment uses stripes each having either a positive non-zero azimuth of 6 degrees or an equal negative non-zero azimuth of 6 degrees. The resulting servo band and its stripes have lateral widths that are significantly greater than that of a servo read element of a data read/write head designed for use with tape 82. For example, in the described embodiment the stripes have a lateral width of about 191 $\mu$m while a servo read element used in a data read/write head in conjunction with tape 82 has a lateral width of about 5 $\mu$m.

FIG. 7 also illustrates the read elements of servo verify head 85. Servo verify head 85 has a single read element 90 corresponding to each servo track 101, 102, 103, and 104, for a total of four servo read elements. Each servo read element 90 is a relatively wide read element in comparison to the read element used in a data read/write head. In particular, each read element 90 extends laterally across the full widths of the magnetic transition stripes in the corresponding servo band. Thus, in the described embodiment, each read element has a lateral width of 185 $\mu$m.

Each servo read element 90 has an azimuth that is different than the azimuths of any of the magnetic transition stripes of the underlying servo bands. Preferably, the azimuth of each read element 90 is approximately or exactly between the positive and negative azimuths of the servo band stripes. In the described embodiment, the read elements each have an azimuth of 0 degrees from the lateral tape direction. In other words, the read elements are oriented along the lateral direction of the tape.

Figure 8:
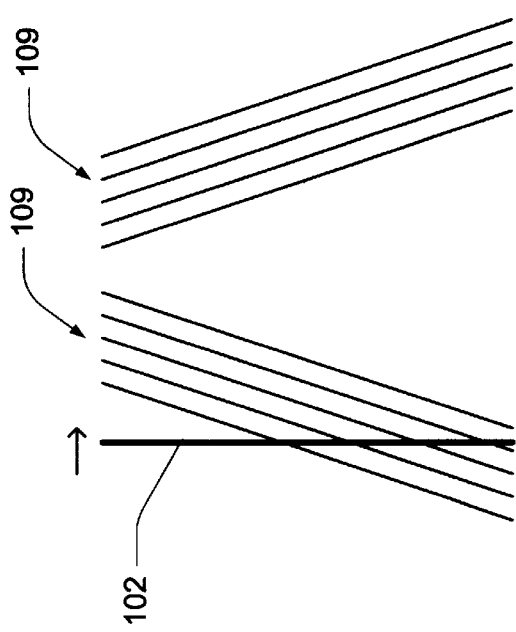
FIG. 8 is a diagrammatic view illustrating the relationship between a verify read head in accordance with the invention and a timing-based servo pattern.

FIG. 8 illustrates the relationship between a single verify read element and the underlying magnetic transition stripes of a single servo band. FIG. 8 illustrates bursts of servo stripes 109 and a servo verify read element 102. The arrow above read element 102 indicates the direction of movement of the read element relative to the servo band stripes. Read element 102 produces a servo verify signal that is used to detect defects in the previously written servo band.

In the described embodiment, the azimuths of the stripes and the longitudinal spacing between the stripes make it so that read element 102 overlies more than one of the stripes at various positions along the servo band such as the position illustrated. In other words, the servo band stripes of a particular burst are spaced closely enough so that a single lateral line simultaneously intersects as many as five stripes, depending on the longitudinal position of the lateral line. Because of this, the signal created by read element 102 is somewhat difficult to analyze and predict.

Figure 9:
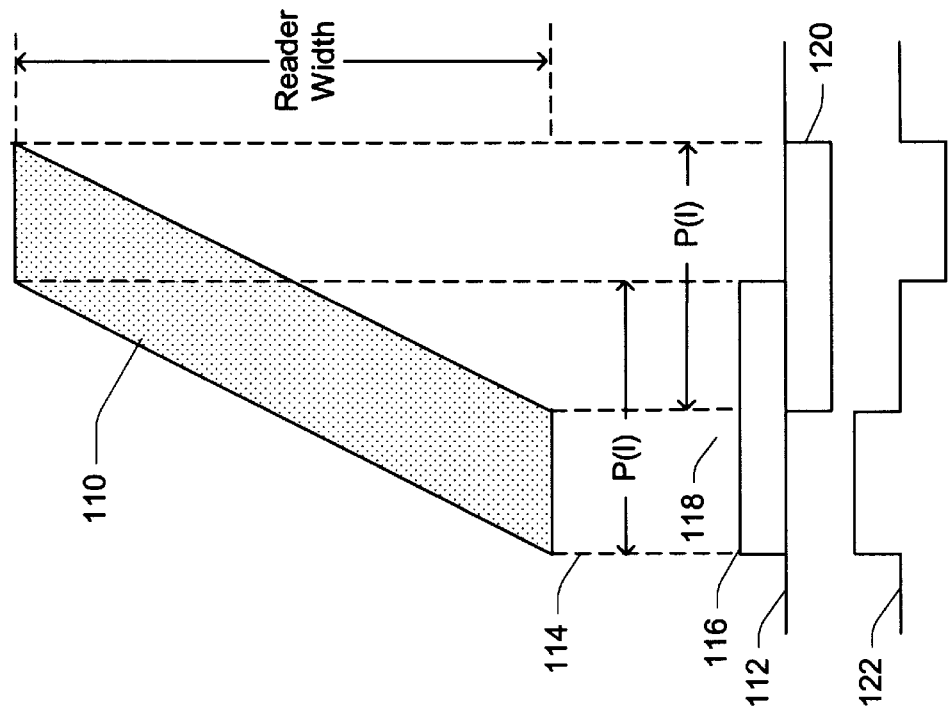
FIG. 9 is a diagrammatic view illustrating analysis of a single non-defective servo stripe in accordance with the invention.

FIGS. 9 and 10 are used as a conceptual aids in understanding and predicting the servo verify signal resulting from a non-defective servo band. FIG. 9 shows a single servo band stripe 110 having an exaggerated thickness and azimuth. It is assumed that a laterally-oriented read element moves relative to the servo band stripe in a left-to-right direction. Waveform 11 2 shows, conceptually, additive elements of a servo verify signal resulting from servo band stripe 110. It is assumed in this discussion that the read element has an infinitely small longitudinal thickness.

When the read element first reaches the initial portion or leading longitudinal edge of servo band stripe 110, indicated by dashed line 114, the read element can be viewed as generating a positive pulse 116 having a length equal to what is referred to as the projected pulse width of the servo band stripe. The projected pulse width is equal to the longitudinal size component of the stripe (assuming a zero stripe thickness) or the lateral size component of the stripe (indicated in FIG. 9 as "reader width") multiplied by the tangent of the stripe's azimuth angle. The projected pulse width is indicated in FIG. 9 by the variable name P(I). When the read element reaches the leading part of the trailing longitudinal edge of servo band stripe 110, indicated by dashed line 118, the read element can be viewed as generating a negative pulse 120, again having a length equal to the projected pulse width.

These conceptual pulses 116 and 120 are summed to produce the actual servo verify signal 122. The actual servo verify signal thus comprises a single leading positive pulse that is spaced in time from a single trailing negative pulse.

Figure 1:
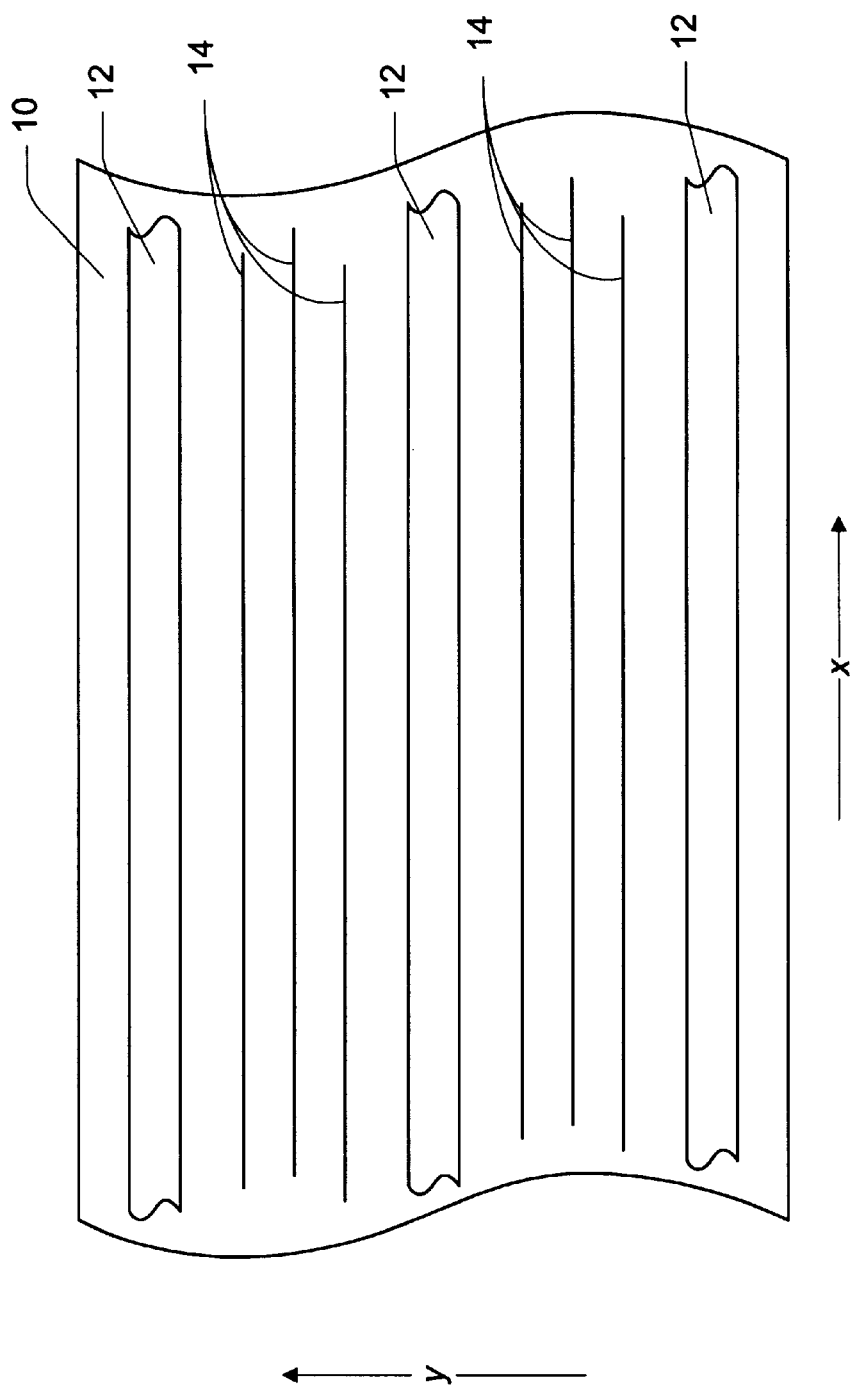
FIG. 1 shows a segment of a prior art linear tape and illustrates the layout of servo bands and data tracks on the linear tape.
Figure 2:
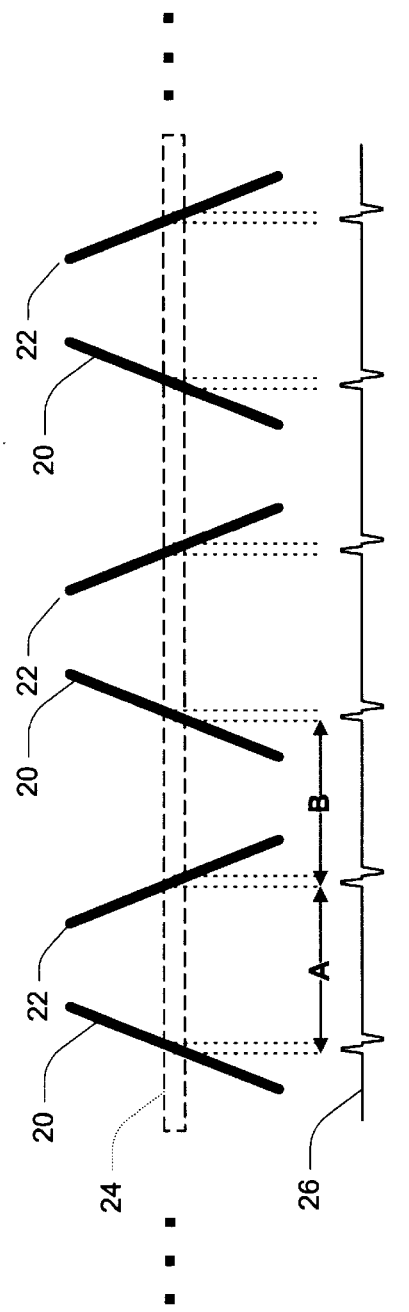
FIG. 2 illustrates a timing pattern such as might be utilized on the servo bands of the linear tape shown in FIG. 1, along with a trace of a read signal resulting from such a timing pattern.
Figure 3:
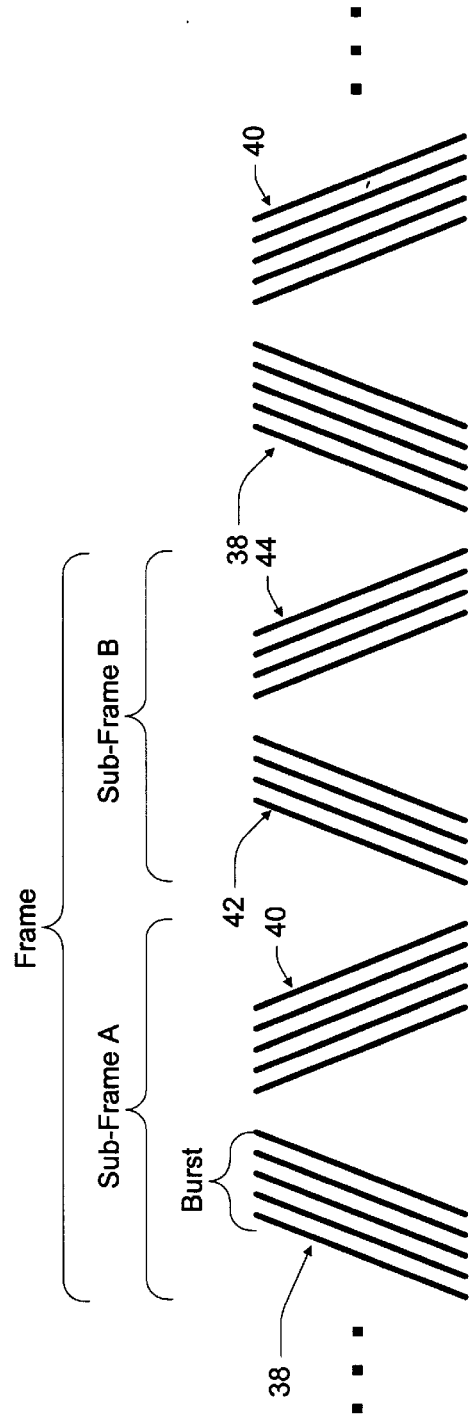
FIG. 3 illustrates a timing pattern similar to that of FIG. 2, using bursts of magnetic transitions or stripes.
Figure 4:
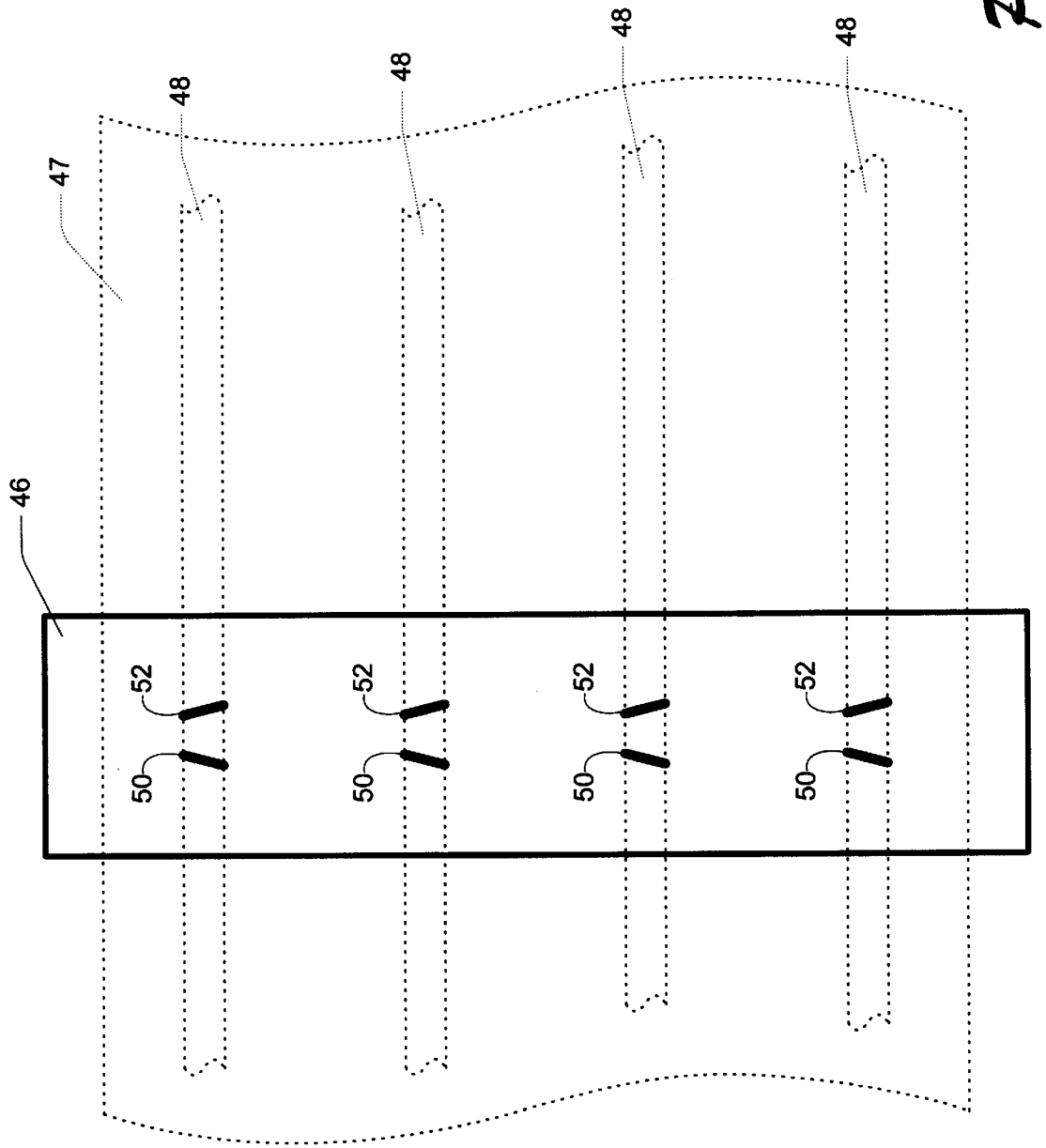
FIG. 4 is a diagrammatic view illustrating a prior art write element pattern in a servo write head, relative to an underlying linear tape.
Figure 5:
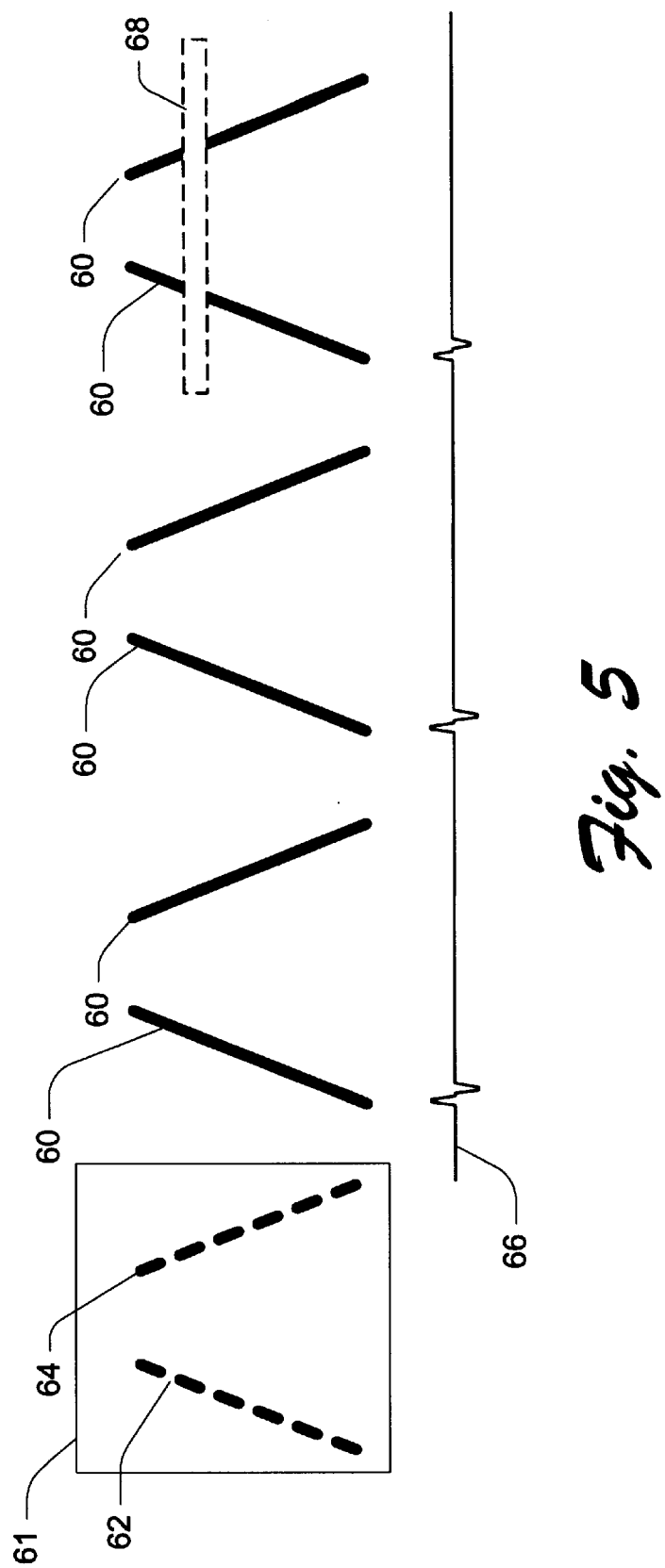
FIG. 5 is a diagrammatic view illustrating a possible configuration of a verify read head shown in relation to a servo band pattern.

FIG. 10 shows a servo verify signal 130 generated by a laterally-oriented read element in response to a burst pattern such as illustrated in FIG. 3, where the read head can overlie several stripes at a time. FIG. 10 shows burst of stripes 132 and 134, each having five individual stripes. Below the bursts are shown five waveforms. A first waveform 141 shows the conceptual pulses generated in response to the first stripe of each burst. A second waveform 142 shows the conceptual pulses generated in response to the second stripe of each burst. A third waveform 143 shows the conceptual pulses generated in response to the third stripe of each burst.

A fourth waveform 144 shows the conceptual pulses generated in response to the fourth stripe of each burst. A fifth waveform 145 shows the conceptual pulses generated in response to the fifth stripe of each burst. These waveforms are summed, resulting in an actual servo verify signal which is represented by waveform 130. In this particular example, each burst is represented by four discrete positive pulses, followed by four discrete negative pulses. Note that the particular azimuth and spacing of this example result in cancellation of an additional positive pulse and an additional negative pulse that coincide with each other. These canceled pulses are shown in dashed lines in FIG. 10.

FIGS. 9 and 10 illustrate the formation of verify signals based on non-defective servo bands. FIGS. 11 and 12 show how such verify signals are altered when the servo band is defective in some way. FIG. 11 shows a single servo band stripe 150 having an exaggerated thickness and azimuth, similar to FIG. 9. In this case, however, there is a longitudinal scratch along the tape, represented by area 152 in FIG. 11. This portion of the tape does not record any magnetic information. Since the stripe is broken, it is analyzed as two different stripes. Using the same analytical concepts introduced in FIG. 9, the first portion of the stripe generates conceptual positive and negative pulses 154 and 155. The second portion of the stripe generates conceptual positive and negative pulses 156 and 157. All four of these pulses are summed to produce the actual servo signal represented by waveform 158, which includes a series of four discrete pulses: a positive pulse, a negative pulse, another positive pulse, and then a final negative pulse. This is much different than the signal shown in FIG. 9; a defect in this case can be detected by simply counting pulses rather than by detecting changes in the amplitudes of the pulses.

FIG. 12 illustrates the effect of a longitudinal scratch along a servo band pattern such as the pattern shown in FIG. 3. In this case, a scratch 160 is illustrated relative to bursts 161 and 162. A first waveform 171 shows the conceptual pulses generated in response to the first stripe of each burst. A second waveform 172 shows the conceptual pulses generated in response to the second stripe of each burst. A third waveform 173 shows the conceptual pulses generated in response to the third stripe of each burst. A fourth waveform 174 shows the conceptual pulses generated in response to the fourth stripe of each burst. A fifth waveform 175 shows the conceptual pulses generated in response to the fifth stripe of each burst. In each case, the conceptual waveforms are similar to that shown in FIG. 11, each consisting of two positive and two negative pulses.

Summing the individual conceptual waveforms results in an actual servo verify signal as represented by waveform 176. Note that both the number of pulses and the amplitude of some of the pulses has changed from the normal case represented by FIG. 10. This results from the different interactions and cancellations of the various conceptual pulses. In some cases, pulses add to each other rather than canceling, resulting in amplitudes that are twice the normal amplitudes.

The analysis above can be performed in a more mathematical manner as follows and as shown in FIGS. 13 and 14. With reference to FIG. 13, each stripe 180 is modeled by a positive pulse 181 of zero width followed by a negative pulse 182 of zero width, separated by the longitudinal thickness of the stripe. FIG. 14 shows waveforms 184 in which each stripe of bursts 186 and 188 is represented by such a pair of pulses. If a stripe is broken by a defect, each portion of the stripe is treated as an individual stripe.

To calculate the actual servo verify signal, each pulse is convolved with the pulse projection of its corresponding stripe. As described above, the pulse projection is the longitudinal width component of the stripe, or the projection of the stripe onto the x axis. Again, when a stripe is broken by a defect, it is analyzed as two separate stripes. The resulting convolution, shown in FIG. 14 by waveform 190, represents the theoretical servo verify signal.

Different servo band defects result in various different types of servo verify signals. Generally, however, such signals can be compared to the ideal signal shown in FIG. 10 with relatively unsophisticated electronics. In a very simple implementation, for example, simple pulse detectors and counters can be used to count positive and negative pulses corresponding to each servo stripe burst. The resulting pulse counts can be compared against predetermined nominal values to detect defects or abnormalities. Statistical analysis is advantageously performed to determine whether such abnormalities rise to the level of defects.

In a slightly more complex defect detection circuit, the amplitudes of both positive and negative pulses can also be measured and compared against a theoretical maximum value, to detect pulses such as those shown in FIG. 12 that are twice the normal amplitude and to detect missing or reduced-amplitude pulses. Counts are maintained of the number of pulses having amplitudes that exceed the maximum value and of the number of pulses that do not exceed a predefined minimum value. These counts are analyzed statistically to provide an additional indication of servo band defects. Note that abnormal pulses such as shown in FIG. 12 vary by 100% from normal pulses, making it very easy to differentiate between the two.

FIG. 15 shows an exemplary implementation of control electronics 88. The circuit includes a pulse or pulse peak detector 202 that is responsive to a servo verify signal to detect pulses in the servo verify signal. Control electronics 88 also includes an amplitude detector 204 that is responsive to the servo verify signal and to the pulse detector to determine amplitudes of the pulses. The control electronics 88 further includes defect detection logic 206, responsive to the pulse and amplitude detectors to count pulses, to identify and count any pulses that exceed a predefined maximum threshold, and to identify servo band defects based on the numbers of such pulses. Preferably, the defect detection logic counts pulses corresponding to each servo stripe burst and compares such counts for adjacent bursts to identify defects.

The elements shown in FIG. 15 can advantageously be implemented by an integrated digital signal processor, resulting in a great degree of configuration flexibility.

Although the invention has been described primarily in terms of its functional characteristics, the invention also includes methodological aspects. For example, the invention includes a method of creating and verifying a servo band on a linear data storage tape. Such a method includes a step of writing a pattern of magnetic transition stripes along the linear data storage tape. In the described embodiment of the invention, each stripe has either a positive 6 degree azimuth or a negative 6 degree azimuth.

A method in accordance with the invention also includes a step of creating a servo verify signal with a magnetic readback element, wherein such an element extends laterally across the full usable widths of the magnetic transition stripes. The readback element is oriented at a 0 degree azimuth, and the transition stripes of the servo band are spaced so that the readback element overlies more than one magnetic transition stripe at a time.

The invention further includes a step of monitoring the servo verify signal to detect defects in the servo band. The monitoring step involves, most generally, comparing the verify signal against a theoretical waveform that is obtained experimentally or using the analyses given above. More specifically, the monitoring step includes counting pulses in the servo verify signal and comparing the number of occurring pulses to a predicted nominal number of pulses for the particular servo pattern being verified. Additionally, the monitoring step includes detecting and counting any pulses that exceed a predefined maximum threshold.

A further step in accordance with the invention comprises analyzing the pulse counts and comparing them to predicted counts to identify servo band defects.

The invention provides an elegant solution to the challenge of verifying timing-based or continuously-variable servo bands. This solution requires only very simple electronics and magnetic read elements, yet verifies the full width and all stripes of a servo track.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

What is claimed is:

1. A method of creating a servo band on a linear data storage tape, the method comprising the following steps:

writing a pattern of magnetic transition stripes along the linear data storage tape, wherein the stripes have lateral widths that are significantly greater than that of a servo read element of a data read/write head designed for use with the linear data storage tape, the stripes having defined azimuths;

creating a servo verify signal with a magnetic readback element that extends laterally across the magnetic transition stripes, the magnetic readback element having an azimuth different than the defined azimuths of the magnetic transition stripes;

monitoring the servo verify signal to detect defects in the servo band.

2. A method as recited in claim 1, further comprising:

writing the magnetic transition stripes at positive and negative azimuths;

positioning the magnetic readback element at an azimuth that is between the positive and negative azimuths of the magnetic transition stripes.

3. A method as recited in claim 1, wherein the magnetic readback element overlies more than one magnetic transition stripe at a time, and wherein the monitoring step comprises detecting when the servo verify signal has pulses with amplitudes exceeding a predefined pulse threshold.

4. A method as recited in claim 1, wherein the monitoring step comprises counting pulses in the servo verify signal to detect defects in the servo band.

5. A method as recited in claim 1, wherein the monitoring step comprises counting numbers of pulses in the servo verify signal and comparing said numbers of pulses to predefined numbers of pulses to detect defects in the servo band.

6. A method as recited in claim 1, further comprising:

positioning the magnetic readback element at a zero azimuth;

writing the magnetic transition stripes at equal positive and negative azimuths;

spacing the magnetic transition stripes so that the magnetic readback element overlies more than one magnetic transition stripe at a time.

7. A method as recited in claim 1, further comprising:

positioning the magnetic readback element at a zero azimuth;

writing the magnetic transition stripes at equal positive and negative azimuths;

spacing the magnetic transition stripes so that the magnetic readback element overlies more than one magnetic transition stripe at a time;

wherein the monitoring step comprises detecting when the servo verify signal has pulses with amplitudes exceeding a predefined pulse threshold.

8. A method as recited in claim 1, wherein the magnetic readback element overlies more than one magnetic transition stripe at a time, and wherein the monitoring step comprises:

monitoring amplitudes of pulses generated by the magnetic readback element;

counting the number of pulses having amplitudes that do exceed a predefined minimum threshold;

counting the number of pulses having amplitudes that exceed a predefined maximum threshold;

identifying servo band defects by analyzing the counted numbers of pulses.

9. A linear data storage tape having a servo band created in accordance with the steps of claim 1.

10. A servo verification device for verifying a servo band on a linear data storage tape, wherein the servo band has patterns of magnetic transition stripes with lateral widths that are significantly greater than that of a servo read element of a data read/write head designed for use with the linear data storage tape, the stripes having non-zero azimuths, the device comprising:

a magnetic readback element that produces a servo verify signal, the magnetic readback element extending laterally across the magnetic transition stripes, the magnetic readback element having an azimuth different than the azimuths of the magnetic transition stripes, wherein the magnetic readback element overlies more than one of the magnetic transition stripes at a time;

a pulse detector that is responsive to the servo verify signal to detect pulses in the servo verify signal;

defect detection logic responsive to the pulse detector to identify servo band defects based on the number of pulses detected in the servo verify signal.

11. A servo verification device as recited in claim 10, further comprising a pulse amplitude detector that detects pulse amplitudes, wherein the defect detection logic is responsive to the amplitude detector to identify servo band defects based on the number of pulses having amplitudes that exceed the predefined maximum.

12. A servo verification device as recited in claim 10, further comprising a pulse amplitude detector that detects pulse amplitudes, wherein the defect detection logic is responsive to the amplitude detector to identify servo band defects based on the number of pulses having amplitudes that exceed a predefined maximum and the number of pulses having amplitudes that do not exceed a predefined minimum.

13. A servo verification device as recited in claim 10, wherein each magnetic transition stripe has either a positive or a negative azimuth and the magnetic readback element has an azimuth that is between the positive and negative azimuths of the magnetic transition stripes.

14. A servo verification device as recited in claim 10, wherein the defect detection logic counts the detected pulses to identify servo band defects.

15. A servo verification device as recited in claim 10, wherein each magnetic transition stripe has either a positive azimuth or an equal negative azimuth and the magnetic readback element has a zero azimuth.

16. A servo verification device as recited in claim 10, wherein the stripes are arranged in adjacent bursts of stripes and wherein the defect detection logic counts the detected pulses in each burst and compares such counts for adjacent bursts to identify defects in a servo band.

17. A device for formatting a linear data storage tape, comprising:

- a servo write head configured to write a pattern of magnetic transition stripes along a servo band of the linear data storage tape, wherein the stripes have lateral widths that are significantly greater than that of a servo read element of a data read/write head designed for use with the linear data storage tape, each stripe having either a positive non-zero azimuth or a negative non-zero azimuth;
- a magnetic readback element that produces a servo verify signal, the magnetic readback element extending laterally across the widths of the magnetic transition stripes, the magnetic readback element being oriented at an azimuth between the positive and negative non-zero azimuths of the magnetic transition stripes, wherein the magnetic readback element overlies more than one of the magnetic transition stripes at a time;
- a pulse detector that is responsive to the servo verify signal to detect pulses in the servo verify signal;
- an amplitude detector that is responsive to the servo verify signal and the pulse detector to determine amplitudes of the pulses;
- defect detection logic responsive to the pulse and amplitude detectors to identify pulses having amplitudes that exceed a predefined maximum, and to identify servo band defects based on the number of such identified pulses.

18. A device as recited in claim 17, wherein the magnetic readback element has a zero azimuth.

19. A device as recited in claim 17, wherein defect detection logic is further responsive to the pulse and amplitude detectors to identify pulses having amplitudes that do not exceed a predefined minimum, and to identify servo band defects based on the number of such identified pulses.

20. A device as recited in claim 17, wherein the stripes are arranged in adjacent bursts of stripes and wherein the defect detection logic counts the pulses corresponding to each burst and compares such counts for adjacent bursts to identify defects in a particular servo band.

* * * * *